US006664428B2

(12) United States Patent
Ostrowski et al.

(10) Patent No.: US 6,664,428 B2
(45) Date of Patent: Dec. 16, 2003

(54) METHOD OF PRODUCING POLYETHERPOLYOLS

(75) Inventors: Thomas Ostrowski, Castrop-Rauxel (DE); Kathrin Harre, Dresden (DE); Georg Heinrich Grosch, Bad Dürkheim (DE); Gerd Höppner, Schwarzheide (DE); Peter de Vocht, Ranst (BE); Dirk Leys, Grobbedonk (BE); Jürgen Winkler, Schwarzheide (DE); Stephan Bauer, Ostercappeln (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/204,293

(22) PCT Filed: Feb. 22, 2001

(86) PCT No.: PCT/EP01/02032

§ 371 (c)(1),
(2), (4) Date: Aug. 20, 2002

(87) PCT Pub. No.: WO01/62825

PCT Pub. Date: Aug. 30, 2001

(65) Prior Publication Data

US 2003/0013921 A1 Jan. 16, 2003

(30) Foreign Application Priority Data

Feb. 24, 2000 (DE) .......................................... 100 08 635

(51) Int. Cl.$^7$ ................................................ C07C 43/11
(52) U.S. Cl. ........................ 568/620; 568/623; 568/624
(58) Field of Search ................................ 568/620, 623, 568/624

(56) References Cited

U.S. PATENT DOCUMENTS

| | | | | |
|---|---|---|---|---|
| 3,894,093 A | 7/1975 | Rainer et al. | ................ | 568/608 |
| 5,478,535 A | 12/1995 | Fierz et al. | ................. | 422/205 |
| 5,811,595 A | 9/1998 | Ellis | ........................... | 568/620 |
| 6,303,833 B1 | 10/2001 | Grosch et al. | ............. | 568/613 |
| 6,362,126 B1 | 3/2002 | Grosch et al. | ............. | 502/154 |
| 6,399,999 B2 | 6/2002 | Hoashi | ........................ | 257/575 |

FOREIGN PATENT DOCUMENTS

| | | | | |
|---|---|---|---|---|
| DE | 1936 046 | 2/1971 | | |
| DE | 1 197 42 978 | 4/1999 | ............ | B01J/31/16 |
| DE | A 198 09 539 | 9/1999 | ............ | B01J/31/22 |
| EP | A 633 060 | 1/1995 | ............ | B01J/19/18 |
| EP | A 850 954 | 7/1998 | ............ | C08F/2/00 |

*Primary Examiner*—Rosalynd Keys
(74) *Attorney, Agent, or Firm*—Fernando A. Borrego

(57) ABSTRACT

A process for the preparation of polyetherpolyols by reacting diols or polyols with ethylene oxide, propylene oxide, butylene oxide or a mixture thereof in the presence of a multimetal cyanide complex catalyst is proposed, the reaction being carried out in a stirred kettle reactor and the reaction mixture being circulated via an external heat exchanger by means of a pump.

10 Claims, No Drawings

METHOD OF PRODUCING POLYETHERPOLYOLS

The present invention relates to a process for the preparation of polyetherpolyols.

Polyetherpolyols are provided in large amounts, in particular for the production of polyurethane foams. The known processes for the production of polyetherpolyols are carried out as a rule from alkylene oxides in the presence of a short-chain initiator with the use of different catalysts, such as bases, water-repellent double-layer hydroxides, acidic or Lewis acid systems, organometallic compounds or multimetal cyanide complexes.

Heterogeneous multimetal cyanide complex catalysts are highly selective and active catalysts which are suitable in particular for the production of flexible-foam polyetherpolyols, where high molecular weight has to be achieved and where long oxalkylation times are required. By using multimetal cyanide complex catalysts, the production costs can be reduced and at the same time high-quality polyetherpolyol, which can be further processed to give polyurethane foams which have little odor and are therefore of high quality, can be obtained. The literature discloses that secondary reactions which may lead to the formation of odorous substances and unsaturated components scarcely occur.

However, as a result of the high activity, the heat of reaction can no longer be removed in conventional reactors. If the polyetherpolyol preparation catalyzed by a multimetal cyanide complex is carried out in standard stirred kettles, the metering rates of the alkylene oxide are limited by the heat removal rate of the heat exchangers.

U.S. Pat. No. 5,811,595 proposes an ideally mixed reactor having one or two heat exchangers. The polyetherpolyol is fed into the circulation stream of the heat exchanger, and the ethylene oxide into the reactor. Mixing of the ethylene oxide with the liquid phase is achieved by a nozzle.

Disadvantages of this process are the high circulation rate, which is required for maintaining the high heat removal capacities, and the danger of mechanical damage to the heterogeneous catalyst by the pump. Furthermore, the highly reactive ethylene oxide is introduced into the reactor, in which, owing to the cooling coils used, the heat removal is particularly poor, in particular at low filling levels owing to the small exchange area. Overheating due to the high reaction rate are the result and can lead to damage of the product. This may be exacerbated by the poor mixing in the reservoir. Although coiled pipes are provided in the reservoir for cooling, they are very ineffective at low filling levels, owing to the small exchange area.

EP 850 954 describes a process in which the reaction takes place in the gas space above the liquid. The polyetherpolyol is circulated via a heat exchanger by means of a pump and is fed in through nozzles. This results in a large liquid surface. At the same time, ethylene oxide and polyetherpolyols are metered in via nozzles. The large surface results in good mass transfer and hence high reaction rates.

Owing to the high reaction rate which can be achieved with this process, local excess temperatures in the individual droplets are to be expected, which in turn result in damage to the product. Furthermore, here too the high circulation rate required for heat removal is not without problems for the heterogeneously dispersed multimetal cyanide complex catalyst; the danger of damage cannot be ruled out.

The artificially enlarged gas phase is still a potential danger, in particular in the case of ethoxylation, since free alkylene oxide is present in the gas phase. Ethylene oxide tends to gas-phase decomposition, which may lead to bursting of the reactor. On the other hand, when the polyetherpolyol or ethylene oxide is passed into the liquid, rapid reaction of the alkylene oxide is to be expected owing to the multimetal cyanide complex present.

EP-B-0 633 060 discloses a reactor for gas-liquid reactions, comprising a central stirring apparatus around which heat exchanger plates through which a heat-exchange medium flows are arranged at an angle of from 0 to 70° in the direction of rotation of the stirrer relative to the reactor radius. Higher productivity, a high product quality and reduced catalyst consumption can be ensured by direct removal of heat at its point of generation. The reactor of EP-B-0 633 060 was proposed in particular for highly exothermic catalytic hydrogenation reactions.

It is an object of the present invention to provide a process which employs simple apparatus for the preparation of polyetherpolyols in the presence of multimetal cyanide complex catalysts with improvement of the space-time yield and avoidance of local overheating and hence a higher level of secondary reactions, i.e. with a guarantee of high product quality.

We have found that this object is achieved by a process for the preparation of polyetherpolyols by reacting diols or polyols with ethylene oxide, propylene oxide, butylene oxide or a mixture thereof in the presence of a multimetal cyanide complex catalyst in a stirred kettle reactor.

In the invention, the reaction mixture is circulated via an external heat exchanger by means of a pump.

It is known that KOH-catalyzed, i.e. homogeneously catalyzed polyetherpolyol preparation can be carried out in a stirred kettle reactor having an external heat exchanger. As a result of the removal of heat in the external heat exchanger, there is no limitation of the heat exchanger areas by the reactor dimensions.

With the use of a heterogeneous catalyst, for example a multimetal cyanide complex catalyst, corresponding to the process of the present invention, however, problems are likely to arise with regard to the deposition of catalyst in the heat exchanger and in the circulation pipes and mechanical damage to the catalyst as a result of the circulation.

Surprisingly, however, it was found that there is no deposition of the fine catalyst in the pump circulation or in the heat exchanger.

Moreover, in spite of the very high circulation rates, no mechanical damage to the catalyst as a result of the shear processes between the running boxes of the pump was observed, which damage would have been expected for a suspended heterogeneous catalyst.

There are no restrictions with regard to the stirred kettle reactors which may be used. Vertical, in particular cylindrical reactors having, preferably, a central stirrer are preferably used. The starting materials are fed into the liquid reaction mixture in the stirred kettle. The reaction mixture is circulated via an external heat exchanger by means of a pump.

Various types of pumps may be used for circulating the reaction mixture.

A screw pump is particularly preferably used for this purpose. In this type of pump, the spindles, owing to the particular profile design of the thread flanks, form sealed chambers whose content is displaced axially and completely continuously from the suction side to the pressure side of the pumps on rotation of the spindles. Screw pumps have the advantage that their delivery is substantially independent of the viscosity, which changes in the course of the reaction. Consequently, sufficient heat removal can be ensured at any time during the reaction.

There are in principle no restrictions with regard to the external heat exchanger. Particularly preferably, the heat exchanger is in the form of plates or coils. Coil-type heat exchangers have the advantage that they subject the catalyst to less mechanical stress. This type of heat exchanger is therefore also used for the preparation of dispersions.

The pump delivery is preferably adjusted so that the reactor content is circulated from 5 to 100, preferably from 20 to 50, times per hour. The concentration of the multimetal cyanide complex catalyst in the reaction mixture is preferably adjusted to <250 ppm, preferably <100 ppm, particularly preferably <50 ppm, based on the total amount of product obtained in the reactor. The process is particularly preferably carried out by the semibatch procedure, i.e. initiator and catalyst are initially taken and the alkylene oxides are metered into the reactor. The heat of reaction is removed in order to be able to control the reaction temperature. The reaction is preferably carried out at from 80 to 200° C. and from 1 to 100 bar.

Particularly preferably, the reaction is carried out at from 90 to 160° C. and from 2 to 20 bar.

There are in principle no restrictions with regard to the multimetal cyanide complex catalysts which may be used; amorphous forms may be used but semicrystalline or crystalline forms are preferred. Particularly preferably used multimetal cyanide complex catalysts are those of the formula (I)

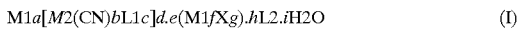

where
- M1 is at least one element from the group consisting of Zn(II), Fe(II), Co(III), Ni(II), Mn(II), Co(II), Sn(II), Pb(II), Fe(III), Mo(IV), Mo(VI), Al(III), V(IV), V(V), Sr(II), W(IV), W(VI), Cu(II), Cd(II), Hg(II), Pd(II), Pt(II), V(III), Mg(II), Ca(II), Sr(II), Ba(II) and Cr(III),
- M2 is at least one element from the group consisting of Fe(II), Fe(III), Co(III), Cr(III), Mn(II), Mn(III), Ir(III), Rh(III), Ru(II), V(IV), V(V), Co(II) and Cr(II),
- L1 is at least one ligand from the group consisting of cyanide, carbonyl, cyanate, isocyanate, nitrile, thiocyanate and nitrosyl,
- X is a formate anion, acetate anion or propionate anion,
- L2 is at least one water-miscible ligand from the group consisting of alcohols, aldehydes, ketones, ethers, polyethers, esters, urea derivatives, amides, nitrites and sulfides,
- a, b, d, e, f and g are each integers or fractions greater than zero and
- c, h and i are each integers or fractions greater than or equal to zero,
- a, b, c and d being chosen so that the electroneutrality condition is fulfilled and
- f and g being chosen so that the electroneutrality condition is fulfilled,
- whose X-ray diffraction pattern has reflections at at least the d values
  - 6.10 Å±0.04 Å
  - 5.17 Å±0.04 Å
  - 4.27 Å±0.02 Å
  - 3.78 Å±0.02 Å
  - 3.56 Å±0.02 Å
  - 3.004 Å±0.007 Å
  - 2.590 Å±0.006 Å
  - 2.354 Å±0.004 Å
  - 2.263 Å±0.004 Å if X is a formate anion, whose X-ray diffraction pattern has reflections at at least the d values
- 5.20 Å±0.02 Å
- 4.80 Å±0.02 Å
- 3.75 Å±0.02 Å
- 3.60 Å±0.02 Å
- 3.46 Å±0.01 Å
- 2.824 Å±0.008 Å
- 2.769 Å±0.008 Å
- 2.608 Å±0.007 Å
- 2.398 Å±0.006 Å if X is an acetate anion, and whose X-ray diffraction pattern has reflections at at least the d values
- 5.59 Å±0.05 Å
- 5.40 Å±0.04 Å
- 4.08 Å±0.02 Å
- 3.94 Å±0.02 Å
- 3.76 Å±0.02 Å
- 3.355 Å±0.008 Å
- 3.009 Å±0.007 Å
- 2.704 Å±0.006 Å
- 2.381 Å±0.004 Å if X is a propionate anion,
or which have a monoclinic crystal system if X is an acetate anion.

The multimetal cyanide complex catalyst used is particularly preferably of the zinc-cobalt type.

Thorough mixing of all components in the stirred kettle was achieved by introducing stirring energy. The external arrangement of the heat exchanger and the large amount of circulated fluid led to virtually complete freedom from reaction temperature gradients over the reactor. By avoiding local overheating, secondary reactions were substantially suppressed and the activation of the catalyst was substantially avoided.

High space-time yields were achieved owing to the good heat removal and the high alkylene oxide metering rates thus possible.

A particular advantage is that, with the novel use of a stirred kettle reactor having an external heat exchanger, a lower product viscosity could be achieved compared with a product which was obtained in a conventional stirred kettle reactor having internal cooling coils or having jacket cooling. With the use of a stirred kettle having an external heat exchanger, a polyetherpolyol having a viscosity of 595 mPa.s was obtained; on the other hand, in a process in a stirred kettle with jacket cooling under otherwise unchanged conditions, a polyetherpolyol having a viscosity of 827 mPa.s was obtained. Furthermore, when a stirred kettle reactor having an external heat exchanger was used, a symmetrical molecular weight distribution was observed. High molecular weight components were not observed. By using the stirred kettle reactor having an external heat exchanger, it was possible to reduce the contents of unsaturated components from 0.061 to 0.005 meq/g and the cycloacetal content from 6 to 0.04 ppm.

The invention is explained in more detail below with reference to embodiments:

The viscosity was determined according to DIN 51 550.

The content of unsaturated components was determined by means of the iodine number. For this purpose, in a first process step the unsaturated fractions were brominated and excess bromine was reacted with potassium iodide solution with precipitation of iodine. The content of unsaturated components in milliequivalents/g (meq/g) was obtained by titrating the precipitated iodine with thiosulfate solution.

The cycloacetal content was determined by headspace GC-MS analysis at a sample temperature of 130° C., the mass trace of m/e=130 being monitored.

COMPARATIVE EXAMPLE 1

A polyetherpolyol was prepared by alkoxylating a polypropylene oxide prepolymer having an average molar mass of 400 g/mol with propylene oxide. The use of KOH as catalyst in a stirred kettle reactor having internal cooling coils led to a symmetrical molar mass distribution without high molecular weight fractions. The worked-up (neutralized) product had a viscosity of 495 mPa.s (25° C.), the content of unsaturated components was 0.061 meq/g and the cycloacetal content was 1.7 ppm. A space-time yield of 105 kg/m3/h was achieved.

COMPARATIVE EXAMPLE 2

The same synthesis as in Comparative Example 1 was repeated in a stirred kettle having external cooling coils. Here too, the molar mass distribution was symmetrical, but high molecular weight components were detected. The viscosity of the worked-up (neutralized) product was 503 mPa.s (25° C.). The content of unsaturated components was determined as 0.060 meq/g and the cycloacetal content as 1.75 ppm. A space-time yield of 115 kg/m3/h was achieved.

COMPARATIVE EXAMPLE 3

The KOH catalyst was replaced by a multimetal cyanide complex catalyst of the Zn—Co type, which was prepared in a two-stage process in which first the acid and then the catalyst were obtained by precipitation. For this purpose, 7 l of strongly acidic ion exchanger which was in the sodium form, i.e. Amberlite® 252 from Rohm & Haas, were introduced into an exchanger column having a length of 1 m and a volume of 7.7 l. The ion exchanger was then converted into the acid form by passing 10% strength hydrochloric acid at a rate of 2 bed volumes per hour over the exchanger column for 9 hours after the sodium content in the discharge was <1 ppm. The ion exchanger was then washed with water. The regenerated ion exchanger was then used for preparing an essentially alkali-free hexacyanocobaltic acid. For this purpose, a 0.24 molar solution of potassium hexacyanocobaltate in water was passed over the ion exchanger at a rate of one bed volume per hour. After 2.5 bed volumes, the potassium hexacyanocobaltate solution was replaced with water. The 2.5 bed volumes obtained had on average a content of 4.5% by weight of hexacyanocobaltic acid and alkali contents of <1 ppm.

For the preparation of the catalyst, 8 553.5 g of zinc acetate solution (content of zinc acetate dihydrate: 8.2% by weight, content of Pluronic®PE 6200, i.e. a block copolymer of ethylene oxide and propylene oxide, which is used for controlling the crystal morphology: 1.3% by weight) were then initially taken in a 20 l reactor and heated to 60° C. while stirring. 9 956 g of hexacyanocobaltic acid solution (cobalt content 9 g/l, content of Pluronic®PE 6200 1.3% by weight) were then added in the course of 20 minutes at 60° C. with constant stirring. The suspension obtained was stirred for a further 60 minutes at 60° C. Thereafter, the solid thus obtained was filtered off and was washed with 6 times the cake volume. The moist filter cake was then dispersed in polypropylene glycol having a molar mass of 400 g/mol.

The dispersion thus obtained was used as the catalyst. The reaction was carried out in a stirred kettle reactor having jacket cooling. After the addition of the catalyst, dewatering and propoxylation were effected for 1 hour under reduced pressure. A symmetrical molecular weight distribution without high molecular weight components was obtained. The viscosity was 827 mPa.s at 25° C. The content of unsaturated components was only 0.0062 and the cycloacetal content 0.05 ppm. The space-time yield achieved was 220 kg/m3/h.

EXAMPLE 1

Comparative Example 3 was repeated, but in a stirred kettle reactor having an external heat exchanger. As in Comparative Example 3, a completely symmetrical molecular weight distribution without high molecular weight components was obtained. The viscosity was 595 mPa.s at 25° C. The content of unsaturated components was 0.0061 and the cycloacetal content 0.04 ppm. The space-time yield achieved was 290 kg/m3/h. Thus, a higher space-time yield and at the same time an improvement in the product quality were achieved by using an external heat exchanger.

We claim:

1. A process for the preparation of polyetherpolyols comprising reacting diols or polyols with ethylene oxide, propylene oxide, butylene oxide or a mixture thereof in the presence of a suspended multimetal cyanide complex catalyst in a stirred kettle reactor, wherein the reaction mixture is circulated via an external heat exchanger by means of a pump.

2. A process as claimed in claim 1, wherein the pump is a screw pump.

3. A process as claimed in claim 1, wherein the delivery of the pump is adjusted so that the reactor content is circulated from 5 to 100 times per hour.

4. A process as claimed in claim 1, wherein the process is carried out by a semibatch procedure.

5. A process as claimed in claim 1, wherein the reaction is carried out at from 80 to 200° C. and from 1 to 100 bar.

6. A process as claimed in claim 5, wherein the reaction is carried out at from 90 to 160° C. and from 2 to 20 bar.

7. A process as claimed in claim 1, wherein the multimetal cyanide complex catalyst corresponds to the formula (I)

$$M^1_a[M^2(CN)_bL^1_c]d.e(M^1_fX_g).hL^2.iH_2O \qquad (I)$$

where $M^1$ is at least one element from the group consisting of ZN(II), Fe(II), Co(III), Ni(II), Mn(II), Co(II), Sn(II), Pb(II), Fe(III), Mo(IV), Mo(VI), Al(III), V(IV), V(V), Sr(II), W(IV), W(VI), Cu(II), Cd(II), Hg(II), Pd(II), Pt(II), V(III), Mg(II), Ca(II), Sr(II), Ba(II) and Cr(III), $M^2$ is at least one element from the group consisting of Fe(II), Fe(III), Co(III), Cr(III), Mn(II), Mn(III), Ir(III), Rh(III), Ru(II), V(IV), V(V), Co(II) and Cr(II), $L^1$ is at least one ligand from the group consisting of cyanide, carbonyl, cyanate, isocyanate, nitrile, thiocyanate and nitrosyl, X is a formate anion, acetate anion or propionate anion, $L^2$ is at least one water-miscible ligand from the group consisting of alcohols, aldehydes, ketones, ethers, polyethers, esters, urea derivatives, amides, nitriles and sulfides, a, b, d, e, f and g are each integers or fractions greater than zero and c, h and i are each integers or fractions greater than or equal to zero, a, b, c and d being chosen so that the electroneutrality condition is fulfilled and f and g being chosen so that the electroneutrality condition is fulfilled, whose X-ray diffraction pattern has reflections at at least the d values 6.10 Å±0.004 Å
5.17 Å±0.04 Å
4.27 Å±0.02 Å
3.78 Å±0.02 Å
3.56 Å±0.02 Å
3.004 Å±0.007 Å
2.590 Å±0.006 Å
2.354 Å±0.004 Å
2.263 Å±0.004 Å if X is a formate anion, whose X-ray diffraction pattern has reflections at at least the d values 5.20 Å±0.02 Å
4.80 Å±0.02 Å
3.75 Å±0.02 Å
3.60 Å±0.02 Å
3.46 Å±0.01 Å
2.824 Å±0.008 Å
2.769 Å±0.008 Å
2.608 Å±0.007 Å
2.398 Å±0.006 Å if X is an acetate anion, and whose X-ray diffraction pattern has reflections at at least the d values 5.59 Å±0.05 Å
5.40 Å±0.04 Å
4.08 Å±0.02 Å
3.94 Å±0.02 Å
3.76 Å±0.02 Å
3.355 Å±0.008 Å
3.009 Å±0.007 Å
2.704 Å±0.006 Å
2.381 Å±0.004 Å if X is a propionate anion or which have a monoclinic crystal system if X is an acetate anion.

8. A process as claimed in claim 1, wherein the multimetal cyanide complex catalyst is substantially or completely crystalline.

9. A process as claimed in claim 8, wherein a multimetal cyanide complex catalyst of the zinc-cobalt type is used.

10. A process as claimed in claim 1, wherein the delivery of the pump is adjusted so that the reactor content is circulated from 20 to 50 times per hour.

* * * * *